(12) United States Patent
Kida et al.

(10) Patent No.: US 7,730,669 B2
(45) Date of Patent: Jun. 8, 2010

(54) DEVICE FOR GUIDING A CONDUCTOR PATH FOR SLIDE DOOR

(75) Inventors: Yuji Kida, Yokkaichi (JP); Shigeru Suzuki, Yokkaichi (JP); Yoshinao Kobayashi, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 208 days.

(21) Appl. No.: 10/942,476

(22) Filed: Sep. 16, 2004

(65) Prior Publication Data

US 2005/0062310 A1   Mar. 24, 2005

(30) Foreign Application Priority Data

Sep. 22, 2003 (JP) .............................. 2003-330115
Sep. 22, 2003 (JP) .............................. 2003-330116

(51) Int. Cl.
  *E05F 11/54* (2006.01)
  *B60J 5/06* (2006.01)
(52) U.S. Cl. ..................... 49/360; 174/72 A; 296/155
(58) Field of Classification Search ............. 49/360, 49/325; 296/155; 174/68.3, 72 A
See application file for complete search history.

(56) References Cited

U.S. PATENT DOCUMENTS

| 6,174,020 B1 | 1/2001 | Knettle et al. | |
| 6,494,523 B2 * | 12/2002 | Kobayashi | 296/155 |
| 6,781,058 B1 * | 8/2004 | DeCicco et al. | 174/72 A |
| 6,997,499 B2 * | 2/2006 | Tsubaki et al. | 296/65.13 |
| 2004/0003543 A1 | 1/2004 | Kobayashi et al. | |
| 2006/0170244 A1 * | 8/2006 | Blase | 296/155 |

FOREIGN PATENT DOCUMENTS

| JP | 11-342-807 | * 12/1999 |
| JP | 11-342807 | 12/1999 |
| JP | 2003-25850 | 1/2003 |

* cited by examiner

*Primary Examiner*—Gregory J. Strimbu
(74) *Attorney, Agent, or Firm*—Gerald E. Hespos; Michael J. Porco

(57) ABSTRACT

Elongate bases (10) for guiding a movable end (37) of a conductor path (30). Cross sections taken through the bases substantially normal to the elongation directions of the bases are substantially identical to one another and substantially constant along the elongation direction of the bases. Thus, the bases (10) can be obtained by cutting an elongated raw material to a specified length in conformity with a vehicle type, thereby enabling a cost reduction. Further, since the bases (10) are symmetrical with a moving path of the movable end (37) located therebetween, it is sufficient to prepare only one kind of elongated raw material. In this respect as well, costs can be reduced.

11 Claims, 6 Drawing Sheets

DEVICE FOR GUIDING A CONDUCTOR PATH FOR SLIDE DOOR

BACKGROUND OF THE INVENTION

1. Field of the Invention

The invention relates to a device for guiding a conductor path for slide door.

2. Description of the Related Art

Japanese Unexamined Patent Publication No. 2003-25850 discloses a device for guiding a conductor path for automotive slide door. This device has two guiding plates mounted on the slide door and a flexible conductor path is arranged in a folded manner between the guiding plates. A fixed end of the conductor path is fixed to the guiding plates and a movable end of the conductor path is connected movably with a guiding portion that extends along a guiding direction of the slide door.

Different types of vehicles often have differently sized slide doors and hence have used differently configured guiding plates. The guiding plates of the above-described guiding device are produced by press-working plates that are stamped into a specified shape. Thus, special guiding plate press molds have been required for each vehicle type and costs have been high.

A movable end of the above-described guiding device is supported on a guidable portion that is engaged slidably with guide rails that extend along a sliding direction of the slide door. Thus, the movable end of the conductor path is not engaged directly with the guide rails and a clearance is defined between the movable end of the conductor path and the guide rails along the guiding direction of the guide rails. The clearance causes a section of the conductor path extending from the movable end to displace towards the guide rails and to take an oblique posture relative to the guide rails when the movable end and the guidable portion move towards a folded section of the conductor path. As a result, a reaction force acts on the guidable member from a side of the movable end in a direction oblique to the guide rails. This oblique reaction force on the guidable member increases sliding resistance at portions of the guidable member that contact the guide rails and may hinder smooth sliding movement of the guidable member.

The invention was developed in view of the above problem and an object thereof is to provide a simple guiding device that operates efficiently.

SUMMARY OF THE INVENTION

The invention relates to a guiding device for guiding a conductor path for a slide door. The guiding device has guides mountable on a slide door substantially parallel with a sliding direction of the slide door. The guides are configured to guide a movable end of a flexible conductor path for connecting a circuit in a vehicle body and a circuit in the slide door. The guides have bases with cross sections normal to the guides that are substantially constant over the entire length. As a result, the bases can merely be cut from an elongated raw material to a length appropriate for a particular vehicle type, thereby reducing costs. Further, the cross sections of the bases are substantially symmetrical with a moving path of the movable end. Thus, it is sufficient to prepare only one kind of elongated raw material, costs can be reduced further.

A fixed end of the conductor path at a side opposite the movable end preferably is prevented from making movements relative to the slide door. Additionally, the bases preferably have a mounting portion for mounting a holding member that holds the fixed end of the conductor path.

The fixed end of the prior art conductor path is fixed directly to the slide door. However, this prior art conductor path would have only the movable end supported on the guiding device unless the guiding device is mounted on the slide door. As a result, the fixed end may shake or hang down from the guiding device, thereby making it difficult to handle the guiding device and the conductor path. However, the conductor path of the subject invention preferably has opposite ends integrally supported on the guiding device. More particularly, the holding member is mounted on the mounting portion and holds the fixed end of the conductor path. Accordingly, the guiding device and the conductor path can be handled more easily.

The bases preferably include a mounting portion. A restricting member is mounted to the mounting portion and extends substantially along a moving path of the conductor path. The restricting member prevents the conductor path from displacing away from the moving path thereof.

The bases preferably have sliding-contact guides, and the conductor path has sliding contacts for contacting the sliding-contact guides.

The conductor path preferably has a flexible holder with holding pieces coupled one after another by shafts. The shafts preferably extend substantially parallel with the spacing direction of the sliding-contacts.

The conductor path may have at least one shock absorber that may function as the sliding-contact.

The guides preferably have inwardly projecting guide rails that extend substantially parallel with a sliding direction of the slide door, and the flexible conductor path is arranged in a folded manner between the guides. A fixed end of the conductor path is fixed to the slide door while having its movement relative to the slide door restricted. However, a movable end of the conductor path is coupled to a guidable member. The guidable member is engaged slidably with the guide rails. A clearance is defined between the movable end of the conductor path and the guide rails in a direction intersecting a guiding direction defined by the guide rails. The guides preferably have sliding-contact guiding means that extend substantially parallel with the guiding direction defined by the guide rails. The conductor path includes sliding-contact means for sliding contact with the sliding-contact guiding means. An area of the conductor path that has the sliding-contact means is held substantially parallel to the guide rails while the sliding-contact means are held substantially in sliding contact with the sliding-contact guiding means. Thus, a reaction force acts on the guidable member from a side of the movable end in a direction parallel to the guide rails, and an increase of sliding resistance at contact portions of the guidable member and the guide rails can be avoided.

The sliding-contact means preferably are at spaced apart positions along the longitudinal direction of the conductor path. Thus, sliding resistance is lower than if the sliding-contact means was an elongated part that was continuous along the longitudinal direction of the conductor path.

A restricting portion preferably is located at a side of the conductor path substantially opposite from the guide rails and extends substantially along a section of the conductor path substantially continuous with the fixed end thereof. The restricting portion restricts the conductor path from bulging out away from the guide rails.

At least one shock absorber preferably is provided on a surface of the conductor path substantially facing the restricting portion. The shock absorber makes a striking sound against another member smaller than a striking sound of the conductor path. The shock absorber contacts the restricting portion when the folded section of the conductor path is displaced towards the restricting portion. The sliding-contact means preferably is on the shock absorber. Thus, there are fewer parts than there would be if the sliding-contact means and the shock absorber were separate.

The sliding-contact guiding means preferably is formed on both guiding members, and the opposite lateral edges of the sliding-contact means with respect to widthwise direction are held substantially in sliding contact with the sliding-contact guiding means.

The conductor path preferably has a long and narrow flexible holding member formed by coupling a plurality of holding pieces one after another by shafts extending in the widthwise direction. Wires or wire harnesses arranged along the flexible holder are held by the holding pieces. The narrow and long flexible holding member formed by coupling a plurality of holding pieces by the shafts extending in widthwise direction prevents a twisting of the conductor path. Thus, the opposite lateral edges of the sliding-contact means are held in sliding contact with the sliding-contact guiding means.

These and other objects and features of the invention will become more apparent upon reading the following detailed description of preferred embodiments and the drawings. It should be understood that even though embodiments are described separately, single features may be combined with other embodiments.

DETAILED DESCRIPTION OF THE PREFERRED EMBODIMENTS

Figure 1:
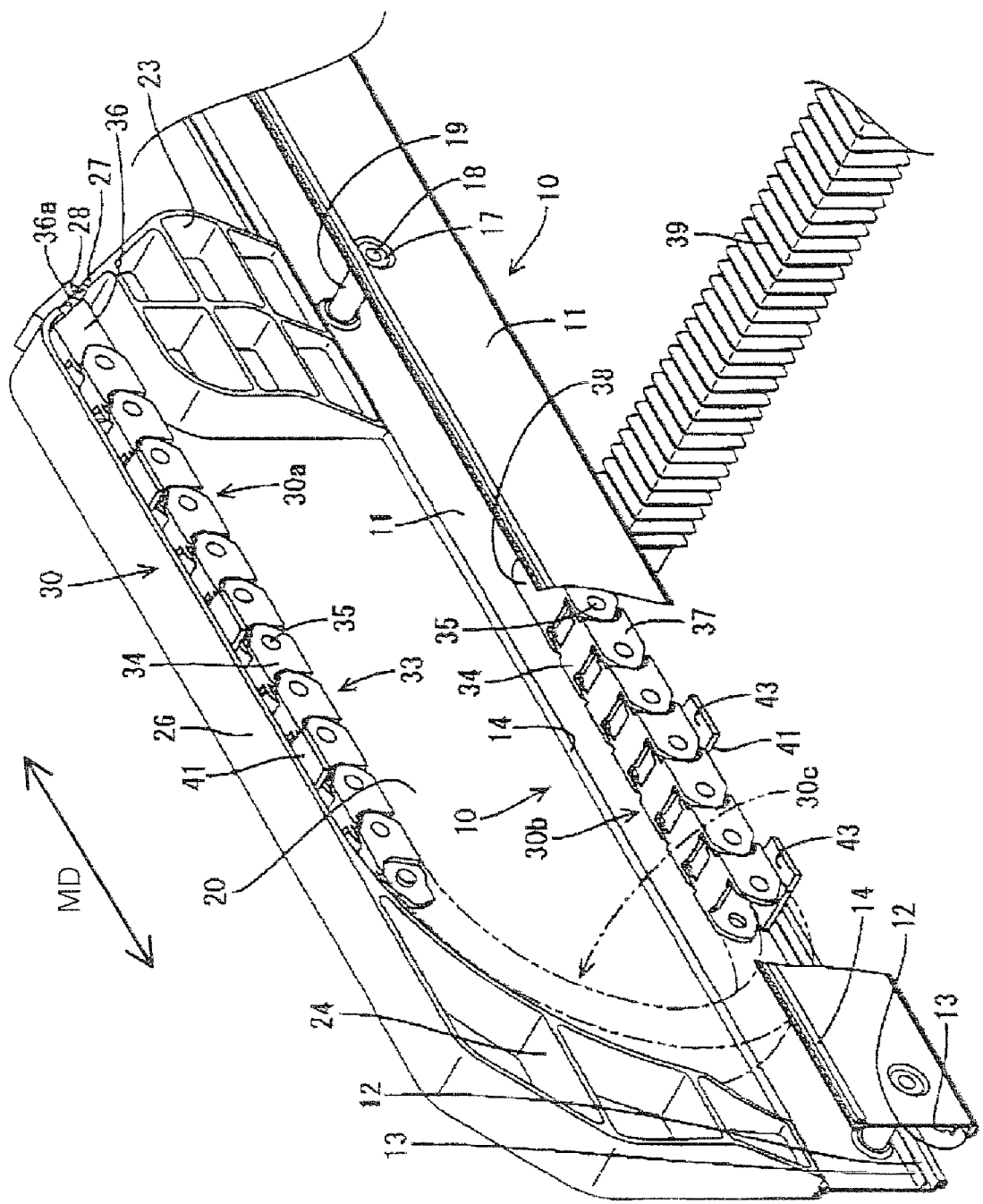
FIG. 1 is a perspective view partly cut away of a guiding device according to one preferred embodiment of the invention.
Figure 2:
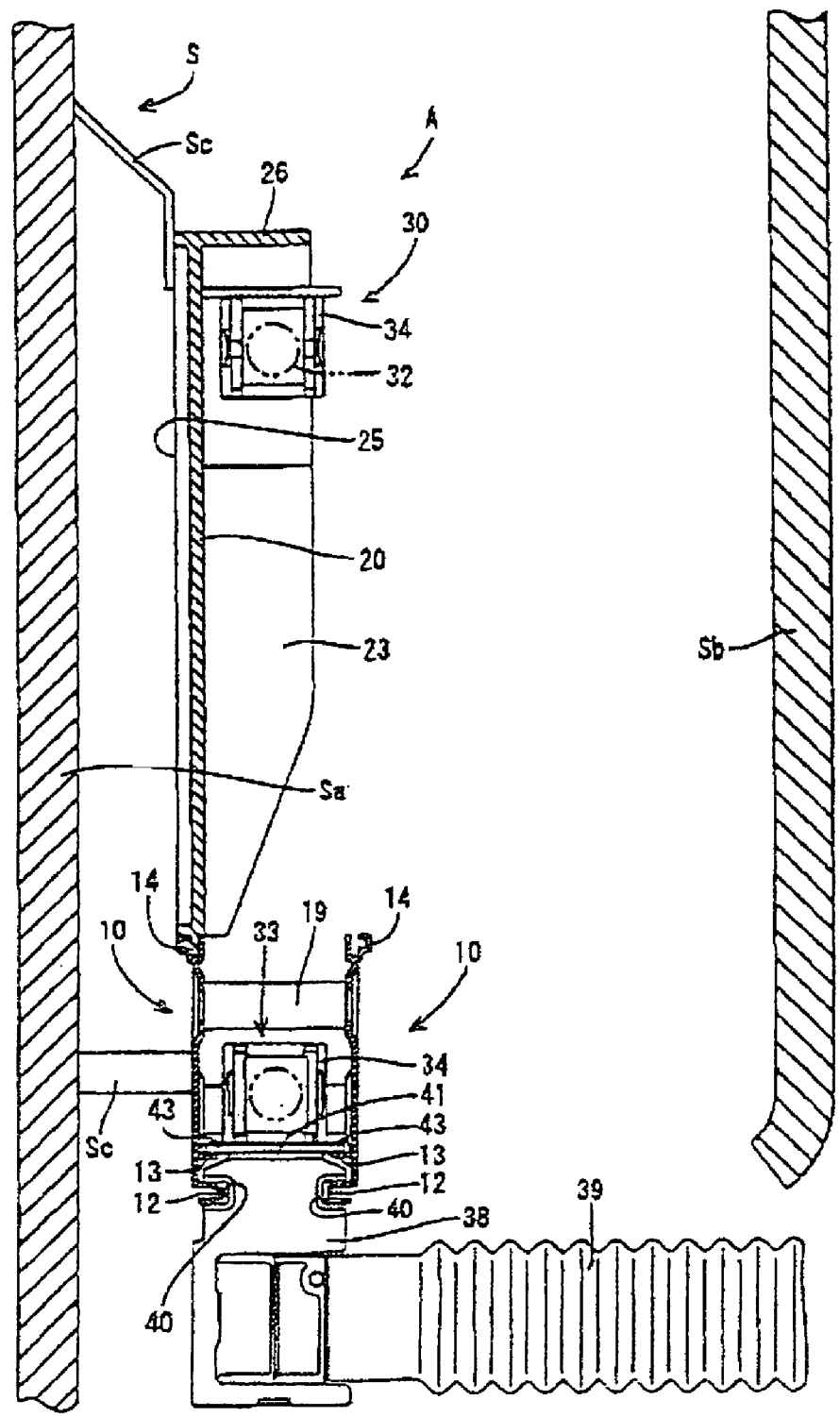
FIG. 2 is a vertical section of the guiding device.
Figure 3:
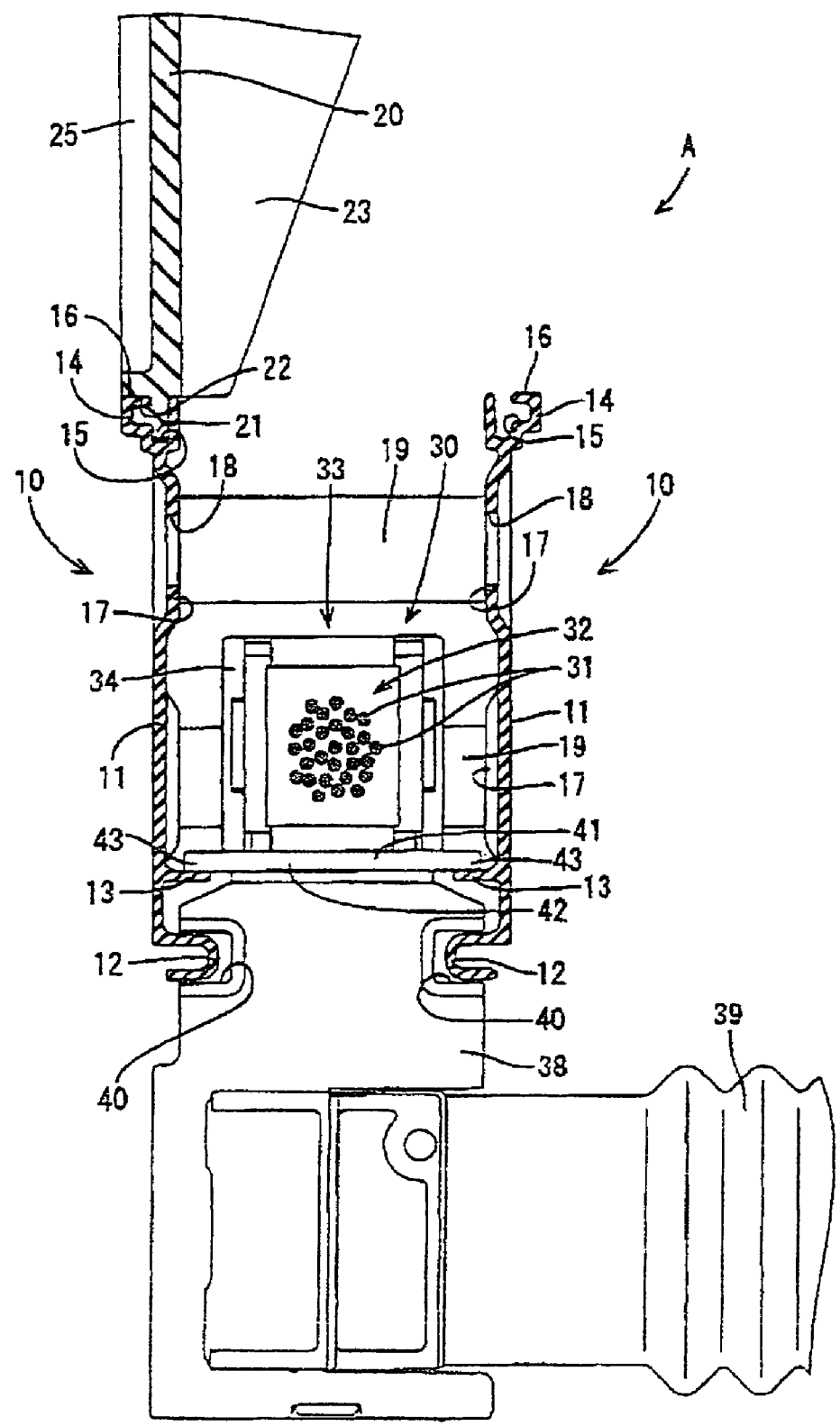
FIG. 3 is a partial enlarged section of the guiding device.
Figure 4:
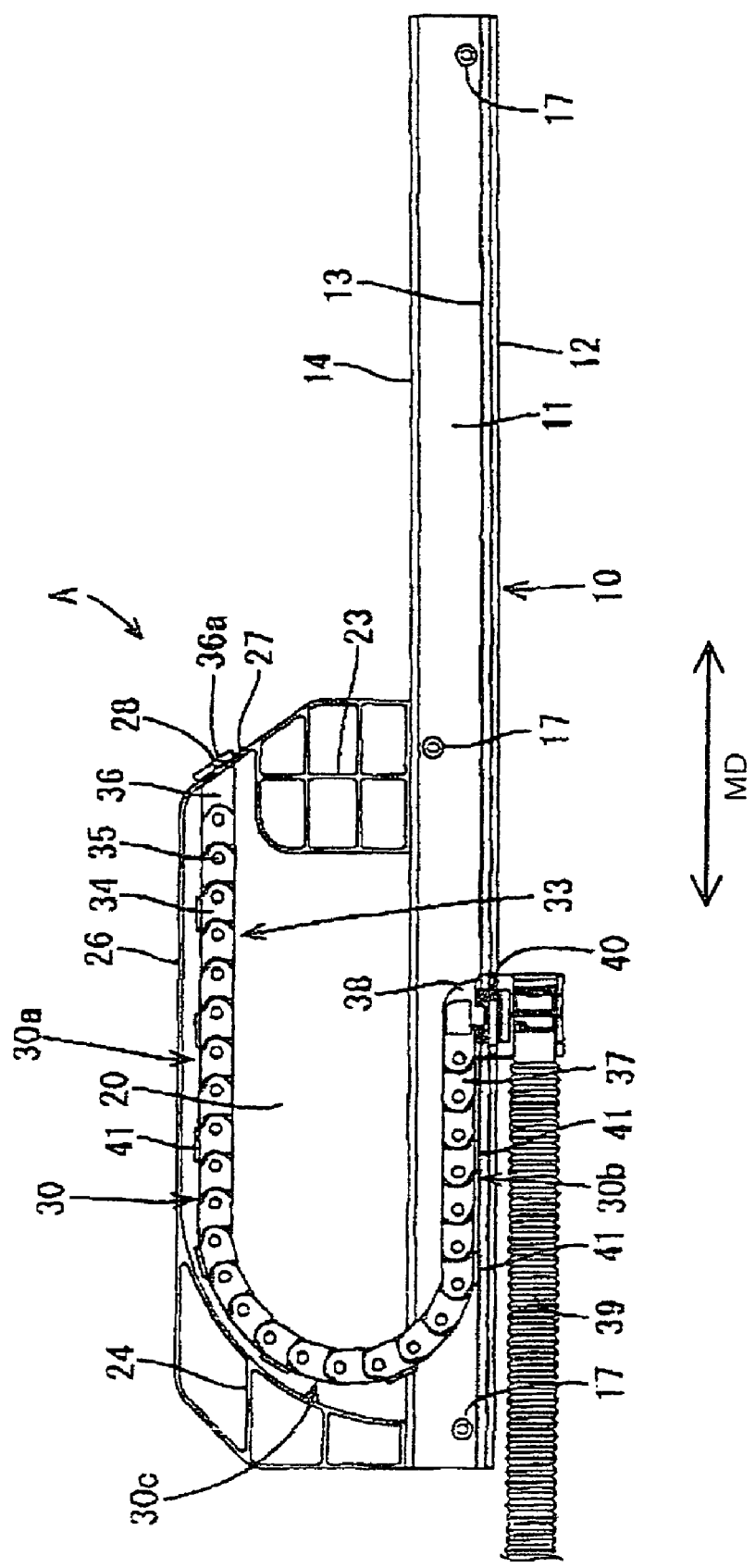
FIG. 4 is a side view showing a state where a slide door is closed.
Figure 5:
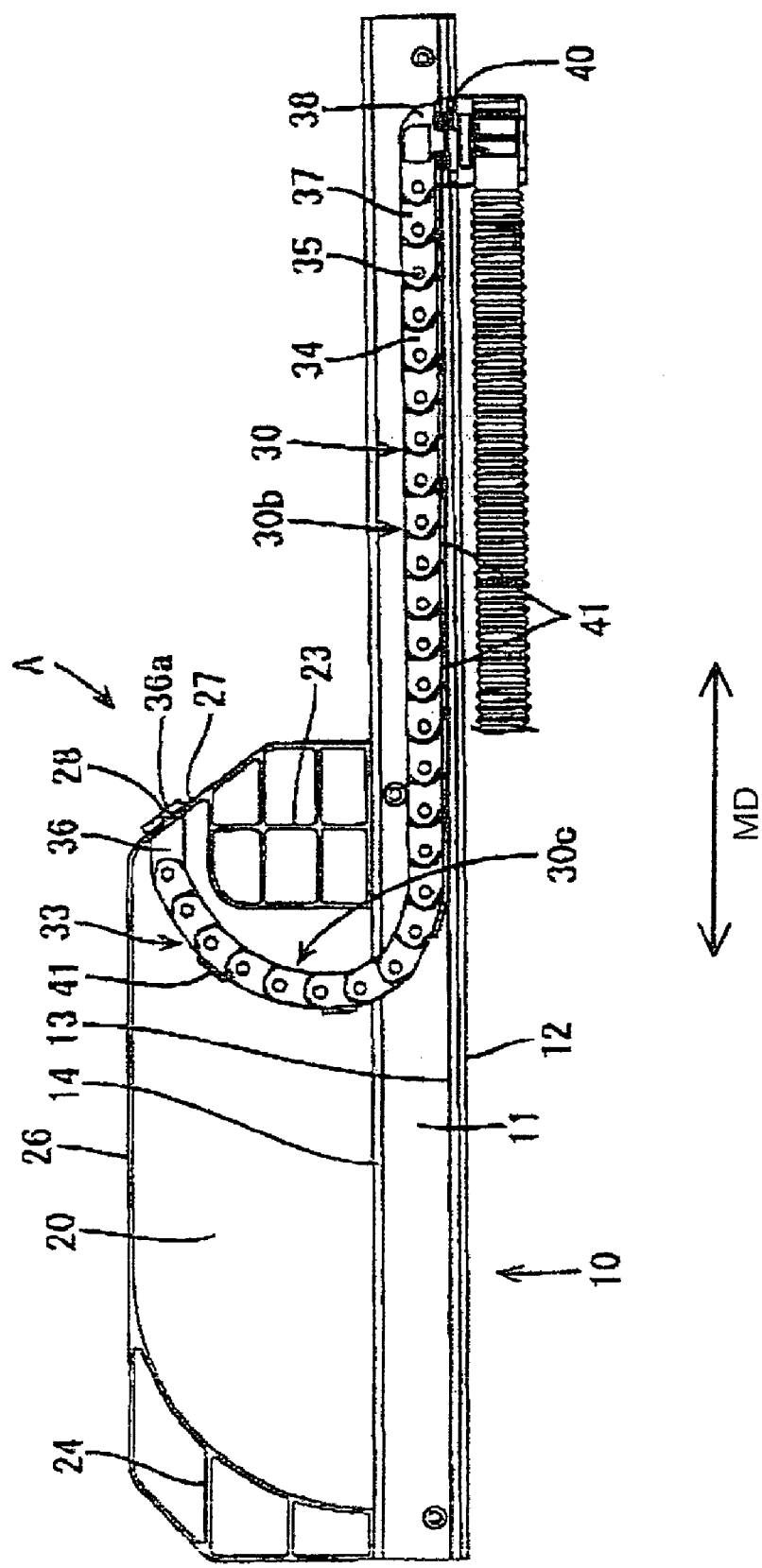
FIG. 5 is a side view showing a state where the slide door is opened.

A guiding device according to a first embodiment of the invention is identified by the letter A in FIGS. 1 to 5. The guiding device A is to be mounted on a slide door S on a side of an automotive vehicle body (not shown) and is designed to guide a flexible conductor path 30 for electrically connecting a vehicle-side circuit (not shown) in a vehicle body and a door-side circuit (not shown) in the slide door S so that the conductor path 30 is held bent within a specified area as the slide door S is opened and closed. In the following description, the right side in FIGS. 1, 4 and 5 is referred to as the front, and reference is made to FIGS. 2 and 3 concerning the transverse direction.

The guiding device A has left and right bases 10 and a restricting member 20 mounted on the upper edge of the left base 10. The bases 10 guide a movable end 37 of the conductor path 30 located at a lower side, whereas the restricting member 20 holds a fixed end 36 of the conductor path 30 at an upper side. The bases 10 and the restricting member 20 perform these functions while being arranged separately at the upper and lower sides.

The bases 10 are long flat plates that are extruded from an aluminum alloy. Additionally, the bases 10 extend substantially straight along forward and backward directions substantially parallel with moving directions MD of the slide door S during opening and closing. A lateral cross section of each base 10 taken normal to the longitudinal direction is substantially constant along the entire length of the base 10. Thus, the extruded material can be cut to a length appropriate for the vehicle type to obtain the bases 10. Furthermore, the bases 10 are substantially transversely symmetrical.

The bases 10 are arranged at substantially the same height and have substantially flat main portions 11 with substantially parallel inner surfaces that face each other transversely. Two U-shaped guide rails 12 are formed at the bottom ends of the main portions 11 and have their openings facing substantially sideways. Folded portions of the guide rails 12 are at substantially the same height and project inward.

Sliding-contact guides 13 project in at substantially right angles from the inner surfaces of the main portions 11 at positions slightly above the guide rails 12 and define substantially flat horizontal plates. A projecting distance of the sliding-contact guides 13 from the inner surfaces of the main portions 11 substantially equals a projecting distance of the guide rails 12 from the inner surfaces of the main portions 11. However, the sliding-contact guides 13 may project more or less than the guide rails 12 provided that sliding-contacts 43 to be described later can be held substantially in contact with the sliding-contact guides 13.

Mounts 14 are formed at the upper ends of the main portions 11 for mounting the restricting member 20. Each mount 14 has a mounting groove 15 with an inner space that has a substantially L-shaped cross section oriented so that a substantially upper half is wider than a substantially lower half. The upper end of each mounting groove 15 is exposed upward and has an opening that is narrower than the width of the upper half of the inner space of each mounting groove 15. This opening is located at the inner side. Thus, a receiving surface 16 adjacent the outer side of the opening is formed at the upper end surface of each base 10.

Each base 10 has rounded embossments 17 that are spaced apart along the longitudinal direction. Each embossment 17 bulges in like a saucer, and has a concentric round through holes 18.

The left and right bases 10 are assembled integrally via cylindrical spacers 19 whose longitudinal axes extend in a direction intersecting the longitudinal direction of the bases 10. The opposite left and right end surfaces of the spacers 19 are held in close contact with the inner surfaces of the embossments 17. Bolts (not shown) then are introduced through the through holes 18 of one base 10 from outside and are inserted through the hollows of the spaces 19 to project out from the through holes 18 of the other base 10. Nuts (not shown) then are screwed down on the projecting parts of the bolts. In this way, the bases 10 are fixed while being spaced apart by a specified distance by the spacers 19.

The restricting member 20 is a substantially flat plate that is shorter along forward and backward directions than the bases 10. The height of the restricting member 20 is substantially smaller than the dimension of the restricting member 20 along forward and backward directions and is substantially larger than the height of the bases 10. The restricting member 20 is made of a synthetic resin in this embodiment, but may be made of a metal or any other substantially rigid material. The restricting member 20 extends up away from the left base 10 and is substantially flush therewith. A rib 21 projects down towards the respective base 10 from the bottom end surface of the restricting member 20 over substantially the entire length of the restricting member 20 along forward and backward directions. The rib 21 has a substantially L-shaped cross section and is closely fittable into the mounting groove 15. A contact surface 22 is formed on an area of the bottom end surface of the restricting member 20 at the outer side of the rib 21 and is held in close contact with the receiving surface 16 of the mounting portion 14 of the base 10. The rear end of the restricting member 20 is substantially aligned with the rear end of the left base 10 when the rib 21 is fit in the mounting groove 15 and with the horizontal contact surface 22 held in surface contact with the horizontal receiving surface 16.

Front and rear reinforcements 23 and 24 are formed respectively at front and rear ends of the inner surface of the restricting member 20 and are comprised of a plurality of inwardly projecting reinforcing walls. An outer-surface reinforcement 25 is formed on the outer surface of the restricting member 20 and is comprised of a plurality of reinforcing walls that project to a lesser extent than the front and rear reinforcements 23, 24.

A restricting wall 26 projects in at substantially at right angles from the upper edge of the restricting member 20 and extends substantially straight along forward and backward directions. A projecting distance of the restricting wall 26 is slightly larger than the width of holding pieces 34 of the conductor path 30 to be described later, and is slightly smaller than the spacing between the left and right bases 10. The opposite front and rear ends of the restricting wall 26 are substantially continuous with the front and rear reinforcements 23, 24. An inclined portion 27 is inclined forward towards the bottom at the front end of the restricting wall 26 and is formed with a notch 28.

The conductor path 30 includes a plurality of wires 31 bundled into a harness 32 and a flexible holder 33 for holding the harness 32 in a folded manner. The flexible holder 33 has a plurality of holding pieces 34 that are coupled sequentially by shafts 35 for hinged movement relative to one another. The holding pieces 34 are frame-shaped so that the harness 32 can be inserted therethrough. The flexible holder 33 is in the form of a caterpillar tread or a chain having two ends, and the adjacent holding pieces 34 can be bent freely in a plane substantially normal to the shafts 35 so that each shaft 35 is a pivoting point. The flexible holder 33 does not twist as it is bent and the holding pieces 34 thereof do not incline in a direction parallel with the longitudinal axes of the shafts 35. The harness 32 is held by the flexible holder 33 and bends while being introduced through the insides of the respective holding pieces 34. Further, the width of the holding pieces 34 is smaller than the spacing between the bases 10.

The conductor path 30 has a fixed end 36 and a movable end 37. The fixed end 36 is at an upper side of the guiding device A in FIG. 4 and has its movement restricted relative to the guiding device A. The movable end 37 is below the fixed end 36 and is guided for movement substantially straight and parallel with a moving direction MD of the slide door S along forward and backward directions relative to the guiding device A. The conductor path 30 is folded substantially semi-circularly so that a line of the holding pieces 34 adjacent the fixed end 36 and a line of the holding pieces 34 adjacent the movable end 38 extend substantially horizontally forward from the fold.

A slit 36a is formed in the outer surface of the fixed end 36 and is engaged closely with the notch 28 of the restricting member 20. Thus, the fixed end 36 of the conductor path 30 is fixed so as not to move relative to the restricting member 20. The harness 32 is inserted through the inside of this fixed end 36 and is connected with the door-side circuit in the slide door S.

A guidable member 38 is coupled displaceably to the front upper end of the movable end 37 by a shaft 35 that extends parallel to the shafts 35 that couple the holding pieces 34. The guidable member 38 is vertically taller and horizontally longer than the holding pieces 34. The harness 32 is introduced through the guidable member 38 and further through the inside of a protective corrugated rubber boot 39 that is coupled to the bottom end of the guidable member 38 for connection with the vehicle-side circuit.

Guidable grooves 40 are formed in the left and right surfaces of the guidable member 38 below the movable end 37 and extend substantially straight along forward and backward directions. The guidable grooves 40 engage the guide rails 12 of the bases 10 to restrict transverse and vertical shaking. In this way, the guidable member 38 and the movable end 37 are guided forward and backward relative to the bases 10 substantially parallel with the moving direction MD of the slide door S.

The guiding device A is accommodated in a space between a first metal panel Sa at the outer side of the slide door S and a second resin panel Sb at the inner side thereof. The guiding device A is fixed with the left surfaces of the left base 10 and the restricting member 20 substantially faced toward the metal panel Sa. Brackets Sc are mounted on the left base 10 and the restricting member 20 in advance by welding, riveting, clamping and/or bolts and nuts. The guiding device A is relatively close to the metal panel Sa. However, a sufficiently large space is left between the guiding device A and the resin panel Sb. Accordingly, the conductor path 30 does not interfere with the resin panel Sb.

A fixed-end section 30a is defined adjacent the fixed end 36 of the conductor path 30 and extends substantially horizontally along the moving direction MD over substantially the entire length of the restricting wall 26 when the slide door S is closed and at the front end of its movable range (see FIG. 4). Additionally, the fixed-end section 30a extends along the right surface of the restricting member 20 and the lower surface of the restricting wall 26. A movable-end section 30b is defined at a side of the movable end 37 and extends substantially horizontally in the moving direction MD along the upper surfaces of the guide rails 12 and between the bases 10. Further, an arcuate section 30c is defined along the rear reinforcing portion 24 between the rear ends of the fixed-end and the movable-end sections 30a 30b. The guidable member 38 and the movable end 37 are near the rear ends of the guide rails 12, and the movable-end section 30b is shorter than the fixed-end section 30a.

The guidable member 38 moves relative to the front ends of the guide rails 12 when the slide door S is moved back in an opening direction (see FIG. 5). Accordingly, the holding pieces 34 of the fixed-end section 30a move down towards the guide rail 12 to form part of the arcuate arranging section 30c and the holding pieces 34 that had formed the arcuate arranging section 30c are moved down towards the guide rail 12 to form part of the movable-end arranging section 30b. As a result, the movable-end arranging section 30b lengthens along forward and backward directions and moves forward; the arcuate horizontal arranging section 30c is displaced forward; and the fixed-end arranging section 30a gradually shortens along forward and backward directions and finally substantially disappears.

The fixed-end section 30a becomes longer and the arcuate section 30c is moved back as the slide door S is closed. The outer surfaces of the holding pieces 34 in the arcuate section 30c could strike against the lower surface of the restricting wall 26 as the slide door S is closed. The holding pieces 34 are made of a polyamide containing glass fibers to ensure rigidity, and thus a large striking sound may be produced when the holding pieces 34 strike against the restricting wall 26. Accordingly, a shock absorber 41 made of a resilient material or POM (polyacetals) is mounted on every second or third holding piece 34 of the flexible holding member 33. The striking produced by the collision of the shock absorber 41 with the restricting wall 26 is smaller than the striking sound of the holding piece 34.

Each shock absorber 41 is substantially planar and has a substantially flat portion 42 parallel with the shaft 35 that couples the holding pieces 34 and a virtual plane connecting the two shafts 35 at the opposite ends of the holding piece 34. The flat portion 42 reduces the striking sound caused by contact against the restricting wall 26.

The guidable grooves 40 in the guidable member 38 engage the guide rails 12 as described above, and a clearance is defined between the upper surfaces of the guide rails 12 and the lower surface of the movable-end section 30b. Thus, the movable-end section 30b may hang down. Accordingly, wing-like sliding-contacts 43 project out from the opposite left and right ends of the flat portion 42 of each shock absorber 41. Two sliding-contacts 43 of each shock absorber 41 on the holding piece 34 of the movable-end section 30b are brought substantially simultaneously into sliding surface contact with the upper surfaces of the sliding-contact guides 13 of the left and right bases 10.

Costs would be high if the bases, including the guide rails 12 for guiding the movable end 37 of the conductor path 30, were press molded, because a different mold would be required for each type of vehicle. However, the bases 10 of this embodiment have a cross section along a direction normal to the guide rails 12 that is substantially constant over the entire length. Thus, the bases 10 can be obtained merely by cutting an elongated raw extruded material to a length in conformity with the vehicle type. Accordingly, there is no need for a press mold for each vehicle type, and costs can be reduced. Further, the bases 10 are substantially symmetrical with respect to the moving path of the movable end 37 or the moving direction MD. Thus, only one kind of elongated raw material is needed and accordingly costs can be reduced further.

The fixed end 36 of the conductor path 30 could be fixed directly to the slide door S. In this situation, the conductor path 30 would have only the movable end 37 supported on the guiding device A unless the guiding device A is mounted on the slide door S. Thus, the fixed end 36 may shake or hang down from the guiding device A, thereby making it difficult to handle the guiding device A and the conductor path 30. However, in this embodiment, the conductor path 30 can have the opposite ends integrally supported on the guiding device A by mounting the restricting member 20 on the mounting portion 14 of the left base 10 and letting the restricting member 20 hold the fixed end 36 of the conductor path 30. Accordingly, the guiding device A and the conductor path 30 can be handled and mounted more easily.

The restricting member 20 is mounted on the mounting portion 14 of the base 10 and extends along the moving direction MD of the moving path of the conductor path 30. Thus, the conductor path 30 cannot displace up or towards the metal panel Sa of the slide door S. Accordingly the conductor path 30 will not interfere with the metal panel Sa.

A vertical clearance could be defined between the movable end 37 of the conductor path 30 and the guide rails 12. Thus, the movable-end section 30b would hang down and approach the guide rails 12 when the movable end 37 and the guidable member 38 moved towards the arcuate section 30c of the conductor path 30. As a result, a reaction force would act on the guidable member 38 from the side of the movable end 37 in an oblique direction to the guide rails 12, and a sliding resistance would increase at a contact portion of the guidable member 38 and the guide rails 12. However, in this embodiment, the sliding-contact guides 13 of the bases 10 are substantially parallel with the guide rails 12, and the sliding contacts 43 of the conductor path 30 contact the sliding-contact guides 13. Additionally, portions of the movable-end section 30b of the conductor path 30 that have the sliding contacts 43 are held substantially parallel with the guide rails 12, and the sliding-contacts 43 are held in sliding contact with the sliding-contact guides 13. In this way, the reaction force acts on the guidable member 38 from the side of the movable end 37 in a direction parallel to the guide rails 12, and there is no increase of the sliding resistance at the contact portion of the guidable member 38 and the guide rails 12.

The shock absorbers 41 of the sliding-contacts 43 are at a plurality of spaced positions along the longitudinal direction of the conductor path 30. Thus, the sliding resistance and noise generation between the sliding-contacts 43 and the sliding-contact guides 13 is reduced as compared to a case where the sliding contacts 43 are elongated pieces continuous along the longitudinal direction of the conductor path 30.

The restricting wall 26 for restricting upward displacement of the fixed-end section 30a is provided at an upper side of the conductor path 30 opposite from the guide rails 12. Additionally, the shock absorbers 41 are on the surface of the conductor path 30 facing the restricting wall 26. Thus, the shock absorbers 41 contact the restricting wall 26 when the arcuate section 30c of the conductor path 30 changes to the substantially straight fixed-end section 30a that faces the restricting wall 26, thereby making a striking sound smaller than when the holding pieces 34 strike the restricting wall 26. In this embodiment, the sliding contacts 43 are at the opposite left and right ends of the shock absorbers 41. Thus, there are fewer parts than if sliding contacts were provided separately from the shock absorbers.

The sliding-contact guide 13 is formed on each base 10, and the sliding-contacts 43 of each shock absorber 41 are held substantially in sliding contact with the sliding-contact guides 13. If the conductor path 30 was inclined transversely or twisted, only one of the left and right sliding contacts 43 would be held in sliding contact with the corresponding sliding-contact guide 13, and sliding resistance would be high. However, the flexible holding member 33 of the conductor path 30 of this embodiment has holding pieces 34 coupled one after another by the shafts 35 that extend substantially parallel with the spacing direction of the of sliding contacts 43. Thus, the conductor path 30 will not incline transversely or twist, and the sliding contacts 43 are held substantially in sliding contact with both sliding-contact guides 13.

Figure 6:
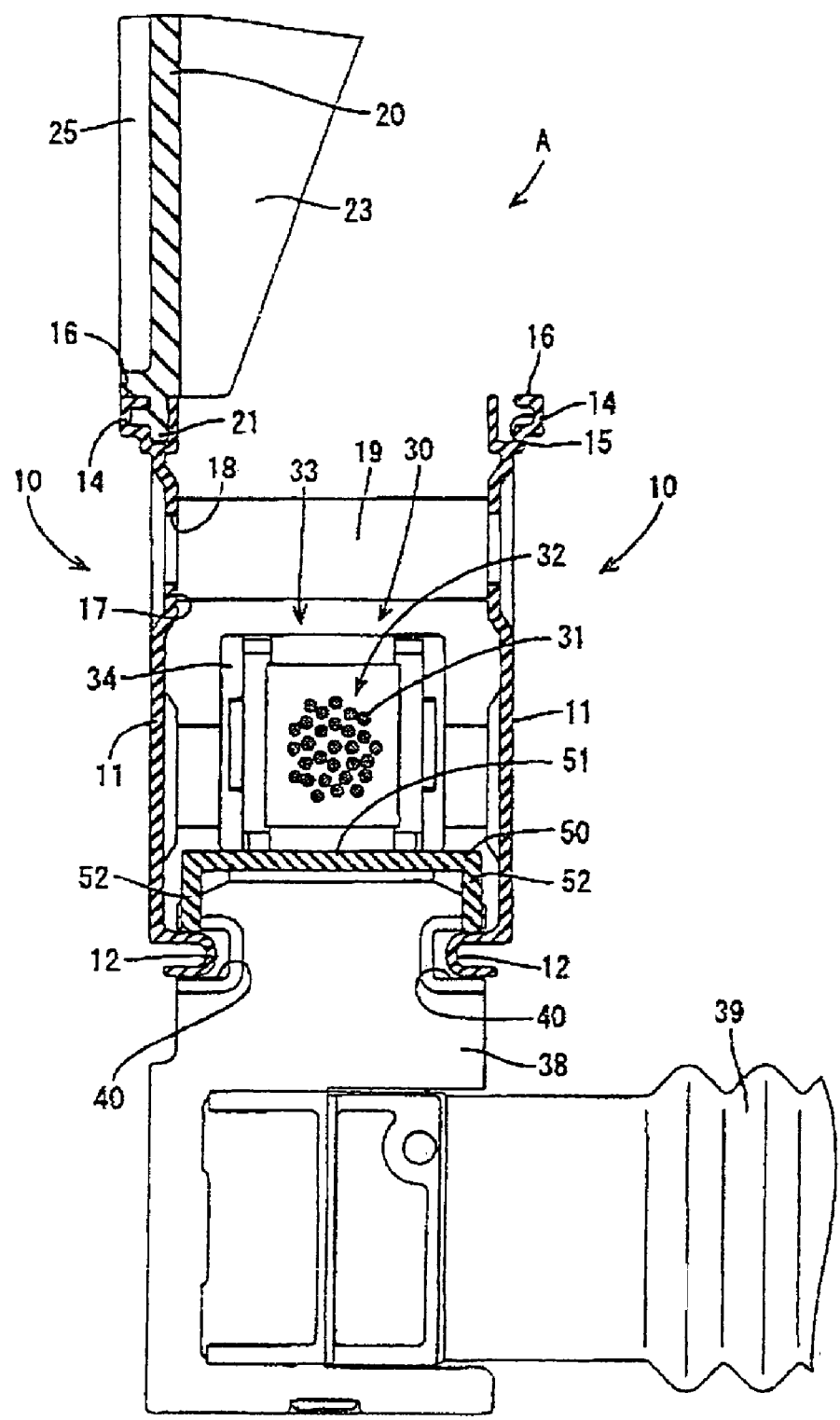
FIG. 6 is a partial enlarged section of a guiding device according to a second embodiment of the invention.

A second embodiment is described with reference to FIG. 6. Although the sliding-contact guides 13 are separate from the guide rails 12 in the first embodiment, the guide rails 12 serve also as the sliding-contact guides in the second embodiment. Each shock absorber 50 on the holding piece 34 is comprised of a flat portion 51 and left and right substantially plate-shaped sliding contacts 52 that project down towards the upper surfaces of the guide rails 12 substantially at right angles from the left and right edges of the flat portion 51. The bottom surfaces of both sliding contacts 52 slide in contact with the upper surfaces of the guide rails 12. Since the other construction is the same as or similar to the first embodiment, no detailed description is given, and similar parts merely are identified by the same reference numerals.

The invention is not limited to the above described and illustrated embodiments. For example, the following embodiments are also embraced by the technical scope of the present invention as defined by the claims. Beside the following embodiments, various changes can be made without departing from the scope and spirit of the present invention as defined by the claims.

The conductor path is folded about a horizontal axis in the foregoing embodiment. However, the invention is also applicable to a case where the conductor path is folded about a vertical axis to locate the fixed end and the movable end at substantially the same height.

The restricting member is only on the left base in the foregoing embodiment, but may be mounted on both bases, on neither base, or only on the right base according to the invention.

The conductor path of the foregoing embodiment has the wires surrounded by the flexible holding member formed by coupling holding pieces one after another. However, the conductor path may be constructed so that wires are surrounded by a cover, such as a flexible corrugate tube made of a resin or adhered to a flexible sheet.

Although the bases are made of an extruded aluminum alloy in the foregoing embodiment, they may be made of another extruded metal.

Although the restricting member is a synthetic resin in the foregoing embodiment, but may be a metal, composite material or any other substantially rigid material according to the present invention.

Although the fixed end of the conductor path is mounted on the restricting member in the foregoing embodiment, it may be mounted directly on the slide door according to the present invention.

The same member serves as the restricting member and the holding member in the foregoing embodiment. However, the restricting member and the holding member may be separate. In this case, a mounting portion for the holding member and the one for the restricting member may be provided independently and separately.

Although the mounting portions are grooves in the foregoing embodiments, they may be ribs or a combination of a groove and a rib.

Although the holding pieces and the shock absorbers are separate in the foregoing embodiment, they may be integral.

The sliding-contacts slide in contact with the sliding-contact guides in the foregoing embodiment. However, they may slide in contact with the guide rails without providing the sliding-contact guides.

Although the sliding-contacts are spaced along the longitudinal direction of the conductor path in the foregoing embodiments, they may extend continuously over substantially the entire length of the conductor path.

The sliding-contact guides are separate from the guide rails in the foregoing embodiments. However, the guide rails may also serve as the sliding-contact guides according to the invention.

Although the bases and the restricting member are separate in the foregoing embodiments, the invention is also applicable to a case where the bases and the restricting member are an integral part.

The shock absorbers are the sliding-contact means in the foregoing embodiments, but the sliding-contact means may be separate from the shock absorbers according to the invention.

Opposite lateral edges of the sliding-contacts slide in contact with the sliding-contact guides in the foregoing embodiments. However, only one lateral edge of the sliding-contact or only a middle part thereof may be held in sliding contact with the sliding-contact guide.

What is claimed is:

1. A guiding device for a slide door, comprising:
   first and second substantially parallel guides spaced apart from one another at all locations on the guides so that no part of the first guide is in direct contact with the second guide, the guides being mountable on the slide door, the guides having guide rails extending substantially parallel to one another, the guides having slides extending substantially parallel to the guide rails;
   spacers holding the guides in said paced parallel relationship, each said spacer having opposite first and second end surfaces detachably mounted on respective opposing facing surfaces of the guides by a fastener extending through said spacer;
   a guidable member disposed between the guides and slidably engaged with the guide rails;
   a flexible conductor path being folded and disposed between the guides, the conductor path having a fixed end configured for being fixed to the slide door, the conductor path further having a movable end coupled to the guidable member, a clearance defined between the movable end of the conductor path and the guide rails; and
   the conductor path including sliding-contacts in sliding contact with the slides, the sliding-contacts being held substantially parallel to the guide rails.

2. The guiding device of claim 1, wherein each of the guides has a plurality of spaced apart spacer mounting structures for receiving the spacers, the guides having identical and constant cross sections directions at all locations between the spacer mounting structures.

3. The guiding device of claim 2, wherein the spacer mounting structures include holes.

4. The guiding device of claim 1, wherein the spacers are tubes.

5. The guiding device of claim 1, wherein the sliding-contacts are spaced apart from one another and disposed between the fixed end and the movable end of the conductor path.

6. The guiding device of claim 1, further comprising a restricting portion for restricting movement of the conductor path.

7. The guiding device of claim 6, further comprising at least one shock absorber on the conductor path, the at least one shock absorber formed from a resilient material.

8. The guiding device of claim 7, wherein at least one of the sliding-contacts is formed on the shock absorber.

9. The guiding device of claim 1, wherein opposite lateral edges of the sliding-contacts are held substantially in said sliding contact with the slides.

10. The guiding device of claim 1, wherein the conductor path comprises a flexible holder formed by a plurality of holding pieces coupled to one another by shafts extending substantially parallel to one another, and at least one wire disposed within the flexible holder.

11. The guiding device of claim 1, wherein each of the guides includes a mounting portion for mounting a restricting member thereto.

* * * * *